US011978973B2

(12) United States Patent
Gondo

(10) Patent No.: US 11,978,973 B2
(45) Date of Patent: May 7, 2024

(54) CONNECTOR

(71) Applicant: Molex, LLC, Lisle, IL (US)

(72) Inventor: Daishi Gondo, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 18/307,040

(22) Filed: Apr. 26, 2023

(65) Prior Publication Data

US 2023/0261403 A1 Aug. 17, 2023

Related U.S. Application Data

(63) Continuation of application No. 17/382,436, filed on Jul. 22, 2021, now Pat. No. 11,721,921, which is a (Continued)

(30) Foreign Application Priority Data

Jun. 18, 2019 (JP) ................................ 2019-112659

(51) Int. Cl.
*H01R 12/00* (2006.01)
*H01R 12/57* (2011.01)
(Continued)

(52) U.S. Cl.
CPC ........... *H01R 12/716* (2013.01); *H01R 12/57* (2013.01); *H01R 12/707* (2013.01);
(Continued)

(58) Field of Classification Search
CPC .... H01R 12/716; H01R 12/57; H01R 12/707; H01R 13/447; H01R 13/504;
(Continued)

(56) References Cited

U.S. PATENT DOCUMENTS 2,433,358 A 12/1947 Garberding
6,503,101 B1 * 1/2003 Yu ..................... H01R 13/6597 439/108
(Continued)

FOREIGN PATENT DOCUMENTS

CN 101436739 A 5/2009
CN 102292874 A 12/2011
(Continued)

OTHER PUBLICATIONS

Ex Parte Quayle Action received for U.S. Appl. No. 29/745,812, dated Jan. 17, 2023, 6 pages.
(Continued)

*Primary Examiner* — Abdullah A Riyami
*Assistant Examiner* — Nelson R. Burgos-Guntin

(57) ABSTRACT

A connector includes: half body parts each including a connector body, and a plurality of terminals attached to the body; end parts formed on both ends of the body formed by allowing the bodies to abut each other; and reinforcing brackets attached to the respective end parts. Each of the bodies is a member integrated with the terminals by primary insert molding, and includes a protrusion extending in the longitudinal direction and holding the terminals, and an embedded part connected to both ends in the longitudinal direction of the protrusion. The end part includes a covering part covering at least the embedded part of each of the bodies, and the covering part is a member integrated with the embedded part and the bracket by secondary insert molding. The connector allows for the spacing between protrusions to be narrowed, simplifying manufacturing, reducing size, and improving reliability.

19 Claims, 11 Drawing Sheets

Related U.S. Application Data continuation of application No. 16/836,921, filed on Apr. 1, 2020, now Pat. No. 11,095,059.

(60) Provisional application No. 62/838,345, filed on Apr. 25, 2019.

(51) Int. Cl.

| | |
|---|---|
| ***H01R 12/70*** | (2011.01) |
| ***H01R 12/71*** | (2011.01) |
| ***H01R 13/447*** | (2006.01) |
| ***H01R 13/504*** | (2006.01) |
| ***H01R 13/627*** | (2006.01) |
| ***H01R 13/631*** | (2006.01) |
| ***H01R 13/639*** | (2006.01) |

(52) U.S. Cl.
CPC ......... *H01R 13/447* (2013.01); *H01R 13/504* (2013.01); *H01R 13/6275* (2013.01); *H01R 13/631* (2013.01); *H01R 13/6395* (2013.01)

(58) Field of Classification Search
CPC .............. H01R 13/6275; H01R 13/631; H01R 13/6395; H01R 13/502; H01R 13/627; H01R 24/00; H01R 12/7088; H01R 12/73; H01R 13/20; H01R 12/71; H01R 13/405; H01R 12/732
See application file for complete search history.

(56) References Cited

U.S. PATENT DOCUMENTS

| | | | | |
|---|---|---|---|---|
| 8,888,506 | B2 * | 11/2014 | Nishimura | H01R 13/405 439/74 |
| 8,986,027 | B2 * | 3/2015 | Nishimura | H01R 43/24 439/74 |
| 10,784,616 | B2 | 9/2020 | Gondo | |
| D918,843 | S | 5/2021 | Furukawa | |
| D922,958 | S | 6/2021 | Yokoyama | |
| 11,095,059 | B2 | 8/2021 | Gondo | |
| D960,107 | S | 8/2022 | Williams Barnett | |
| D967,776 | S | 10/2022 | Kobuchi | |
| D971,152 | S | 11/2022 | Horino et al. | |
| 11,658,431 | B2 | 5/2023 | Gondo | |
| 11,764,510 | B2 | 9/2023 | Tanaka | |
| 2005/0032400 | A1 * | 2/2005 | Zhang | H01R 12/716 439/74 |
| 2005/0042924 | A1 * | 2/2005 | Zhang | H01R 13/6582 439/607.36 |
| 2006/0063432 | A1 * | 3/2006 | Chen | H01R 13/658 439/607.36 |
| 2006/0276061 | A1 * | 12/2006 | Koguchi | H01R 12/725 439/74 |
| 2008/0207014 | A1 * | 8/2008 | Takeuchi | H01R 13/6275 439/74 |
| 2008/0305657 | A1 * | 12/2008 | Midorikawa | H01R 4/028 439/74 |
| 2009/0061655 | A1 * | 3/2009 | Miyazaki | H01R 13/20 439/74 |
| 2010/0068900 | A1 * | 3/2010 | Wu | H01R 12/716 439/74 |
| 2011/0263140 | A1 * | 10/2011 | Sato | H01R 12/7052 439/74 |
| 2013/0012039 | A1 * | 1/2013 | Nose | H01R 12/73 439/74 |
| 2015/0079816 | A1 * | 3/2015 | Suzuki | H01R 13/6275 439/74 |
| 2015/0140840 | A1 * | 5/2015 | Nishimura | H01R 12/775 439/74 |
| 2015/0140841 | A1 * | 5/2015 | Watanabe | H01R 12/7011 439/74 |
| 2015/0207248 | A1 * | 7/2015 | Takenaga | H01R 12/716 439/74 |
| 2016/0036145 | A1 * | 2/2016 | Hasegawa | H01R 12/73 439/78 |
| 2016/0073486 | A1 | 3/2016 | Teramoto | |
| 2016/0190719 | A1 * | 6/2016 | Brzezinski | H01R 12/716 29/874 |
| 2017/0098900 | A1 | 4/2017 | Kobuchi | |
| 2020/0044374 | A1 * | 2/2020 | Ishida | H01R 12/716 |
| 2020/0127400 | A1 | 4/2020 | Sasayama et al. | |
| 2020/0343660 | A1 | 10/2020 | Gondo | |
| 2022/0247104 | A1 | 8/2022 | Miyahara | |
| 2023/0261401 | A1 | 8/2023 | Yayoshi | |
| 2023/0291153 | A1 | 9/2023 | Ebisawa | |

FOREIGN PATENT DOCUMENTS

| | | | |
|---|---|---|---|
| CN | 202103222 | U | 1/2012 |
| CN | 103168395 | A | 6/2013 |
| CN | 205178062 | U | 4/2016 |
| CN | 106067623 | A | 11/2016 |
| CN | 109038013 | A | 12/2018 |
| JP | H10125420 | A | 5/1998 |
| JP | 2001126789 | A | 5/2001 |
| JP | 3368471 | B2 | 1/2003 |
| JP | 2005510850 | A | 4/2005 |
| JP | 2014056762 | A | 3/2014 |
| JP | 2014075295 | A | 4/2014 |
| JP | 2016096079 | A | 5/2016 |
| JP | 6174005 | B2 | 8/2017 |
| JP | 2018081569 | A | 5/2018 |
| JP | 2018081869 | A | 5/2018 |
| JP | 2019003918 | A | 1/2019 |
| KR | 20130129111 | A | 11/2013 |
| KR | 20140044738 | A | 4/2014 |
| KR | 20150110313 | A | 10/2015 |
| KR | 20180072533 | A | 6/2018 |
| KR | 20180123980 | A | 11/2018 |
| TW | D195136 | S | 1/2019 |
| WO | 2019021611 | A1 | 1/2019 |

OTHER PUBLICATIONS

Non-Final Office action received for U.S. Appl. No. 17/603,583, mailed on Mar. 13, 2024, 10 pages.

* cited by examiner

CONNECTOR

RELATED APPLICATION

This application is a continuation of U.S. application Ser. No. 17/382,436 filed on Jul. 22, 2021, which is a continuation of U.S. application Ser. No. 16/836,921, filed on Apr. 1, 2020, which claims priority to Japanese Application Serial No. 2019-112659, filed on Jun. 18, 2019 and U.S. Provisional Application No. 62/838,345 filed on Apr. 25, 2019, each of which are incorporated herein by reference in their entirety.

TECHNICAL FIELD

The present disclosure relates to a connector.

BACKGROUND ART

Conventionally, connectors such as board to board connectors, etc., have been used to electrically connect pairs of parallel circuit boards together. These types of connectors are attached to mutually facing surfaces on pairs of circuit boards and provide conduction when mated together (for example see patent document 1).

FIG. 11 is a perspective view illustrating a known connector.

In the drawing, 811 is a connector housing mounted on a circuit board (not illustrated), which has a pair of elongated long protrusions 812 extending in the longitudinal direction. A plurality of terminals 861 is attached in the respective protrusions 812 along the longitudinal direction of the connector.

Furthermore, when the connector is mated with the counterpart connector not illustrated, the protrusions 812 are inserted into a pair of recessed grooves formed in a counterpart housing of a counterpart connector. Thus, the terminals 861 contact and become conductive with respective terminals (not illustrated) attached in the recessed grooves.

Patent Document 1: Japanese Unexamined Patent Application Publication No. 2001-126789

SUMMARY

However, with the known connector, since the terminals 861 are formed integrally with the housing 811, when attempting to reduce size, the spacing between the protrusions 812 becomes smaller to reduce the pitch of the terminals 861, making manufacturing difficult. Since the terminals 861 are normally integrated with the pair of protrusions 812 of the housing 811 using a molding method called overmolding or insert molding, when the spacing between the protrusions 812 becomes smaller to reduce the pitch of the terminal 861, it is difficult to accurately dispose the lot of terminals 861 at positions corresponding to the pair of protrusions 812 in the mold of the housing 811.

Here, an objective is to resolve the problems of the convention connector, enabling narrowing the interval between protrusions for mounting a plurality of terminals and therefore enabling size reduction, and providing a connector with high reliability.

Thus, a connector includes: half body parts each including a connector body, and a plurality of terminals attached to the connector body; body end parts formed on both ends of the connector body formed by allowing the connector bodies to abut each other; and reinforcing brackets attached to the respective body end parts. Each of the connector bodies is a member integrated with the terminals by primary insert molding, and includes a protrusion extending in the longitudinal direction and holding the terminals, and an embedded part connected to both ends in the longitudinal direction of the protrusion. The body end part includes a covering part covering the embedded part of each of the connector bodies, and the covering part is a member integrated with the embedded part and the reinforcing bracket by secondary insert molding.

In another connector, an extended end part is connected to both ends in the longitudinal direction of the protrusion, and the embedded part extends from the extended end part.

In yet another connector, the reinforcing bracket includes an upper plate extending in the width direction of the connector body, a pair of left and right legs connected to both left and right edges of the upper plate and extending downward, and an end wall outer surface covering part and an end wall inner surface covering part connected to both front and rear edges of the upper plate and extending downward, the embedded part is disposed so as at least partially overlap with the upper plate, the legs, the end wall outer surface covering part, and the end wall inner surface covering part when viewed from vertical, front-back, and left-right directions.

In yet another connector, the embedded part of each of the connector bodies includes a parallel inner surface extending in the longitudinal direction of the connector body and facing the embedded part of another connector body, and a distance L2 between the opposed parallel inner surfaces is smaller than a width L1 of the end wall inner surface covering part of the reinforcing bracket disposed so as to face the gap between the opposed parallel inner surfaces.

In yet another connector, the end wall inner surface covering part is opposed to an inclined inner surface of the embedded part, the inclined inner surface being connected to each of the opposed parallel inner surfaces and inclined with respect to the longitudinal direction of the connector body, and has a gap from the inclined inner surface.

In yet another connector, the embedded part of each of the connector bodies extends in the longitudinal direction of the connector body and includes an outer surface opposed to the leg of the reinforcing bracket, and a length L4 of the outer surface is smaller than a length L3 of the leg.

In yet another connector, an extended end part of each of the connector bodies is inclined inward in the width direction of the connector and extends from both ends in the longitudinal direction of the protrusion, and a width of the body end part is smaller than a width of the connector.

A connector pair includes the connector of the present disclosure and a counterpart connector that mates with the connector.

In a connector according to the present disclosure, the interval between protrusions where the plurality of terminals is mounted can be narrowed, simplifying manufacturing, reducing size, and improving reliability.

BRIEF DESCRIPTION OF DRAWINGS

FIGS. 5A and 5B show two-sided views illustrating a first step of manufacturing a first protruding end part of the first connector according to the present embodiment, wherein FIG. 5A is a top view, and FIG. 5B is a bottom view.

FIGS. 6A and 6B show two-sided views illustrating a second step of manufacturing the first protruding end part of the first connector according to the present embodiment, wherein FIG. 6A is a top view, and FIG. 6B is a bottom view.

FIGS. 7A and 7B show enlarged views illustrating the main parts of the first and second steps of manufacturing the first protruding end part of the first connector according to the present embodiment, wherein FIG. 7A is an enlarged view illustrating a part E in FIG. 5B, and FIG. 7B is an enlarged view illustrating a part F in FIG. 6B.

FIGS. 8A-8D show cross-sectional views illustrating the first and second steps of manufacturing the first protruding end part of the first connector according to the present embodiment, wherein FIG. 8A is a cross-sectional view taken along a line A-A in FIG. 5A, FIG. 8B is a cross-sectional view taken along a line B-B in FIG. 5A, FIG. 8C is a cross-sectional view taken along a line C-C in FIG. 6A, and FIG. 8D is a cross-sectional view taken along a line D-D in FIG. 6A.

DETAILED DESCRIPTION OF PREFERRED EMBODIMENTS

An embodiment will be described in detail below with reference to the drawings.

Figure 1:
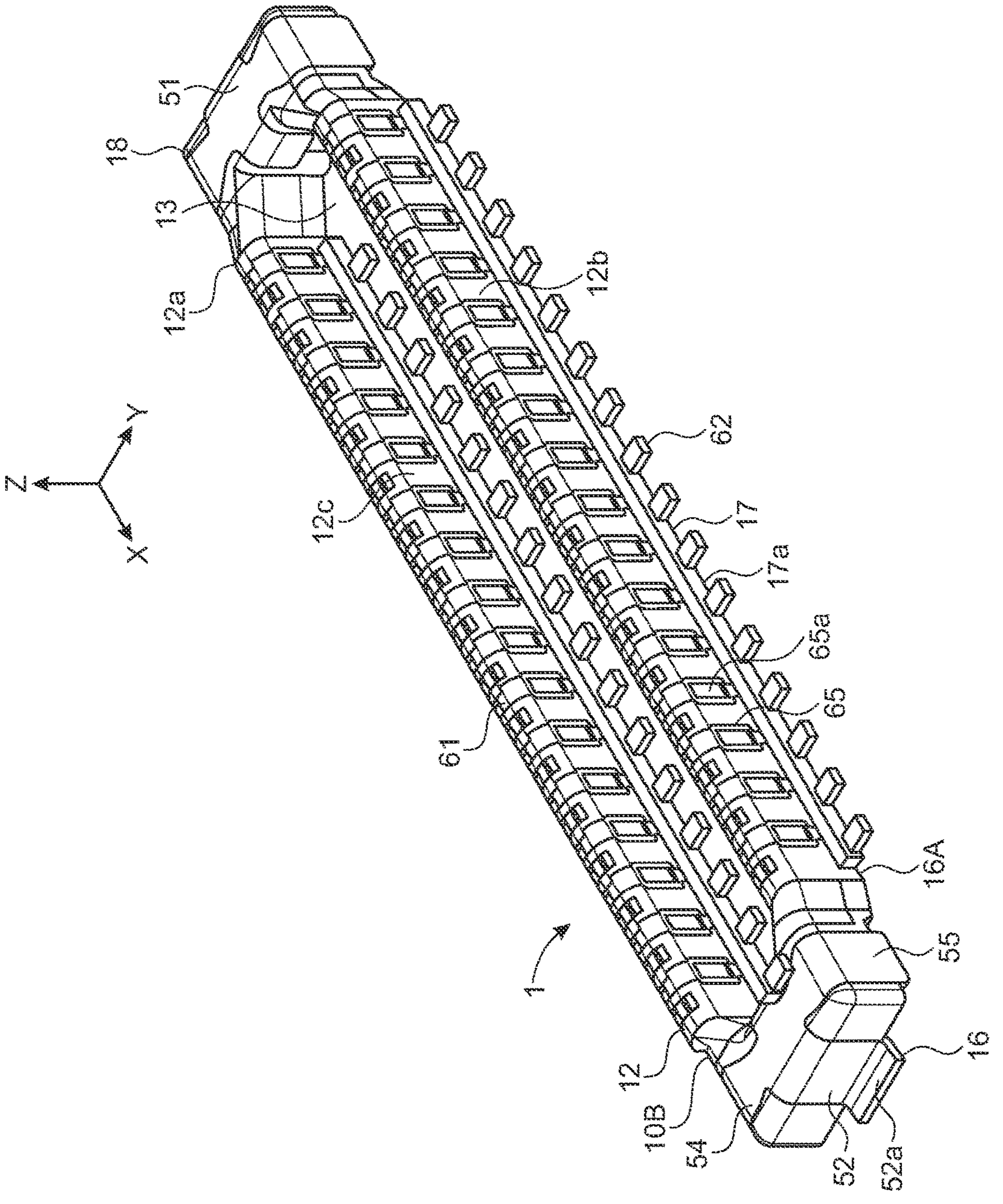
FIG. 1 is a perspective view illustrating a first connector according to the present embodiment.
Figure 2:
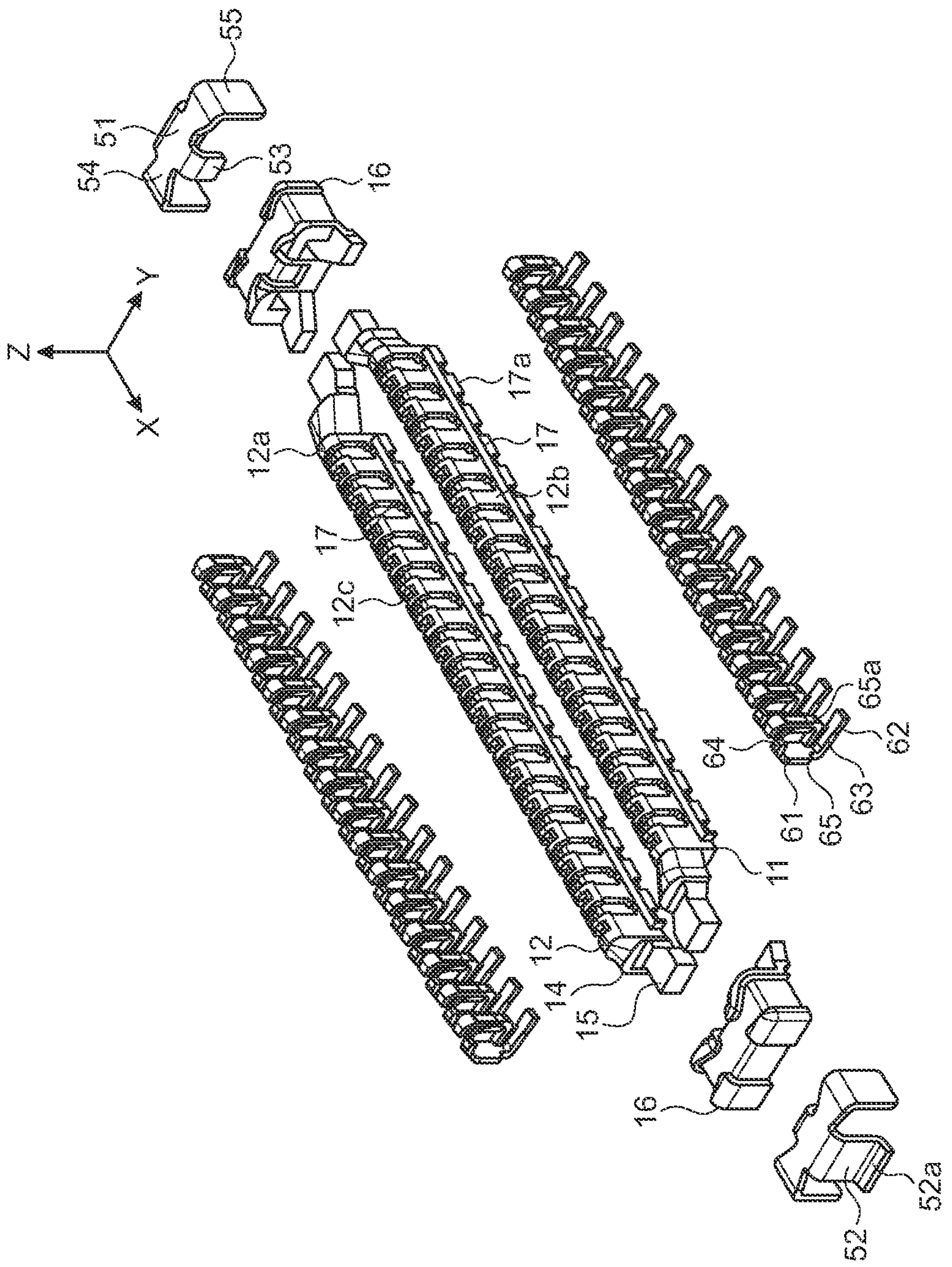
FIG. 2 is an exploded view illustrating the first connector according to the present embodiment.
Figure 3:
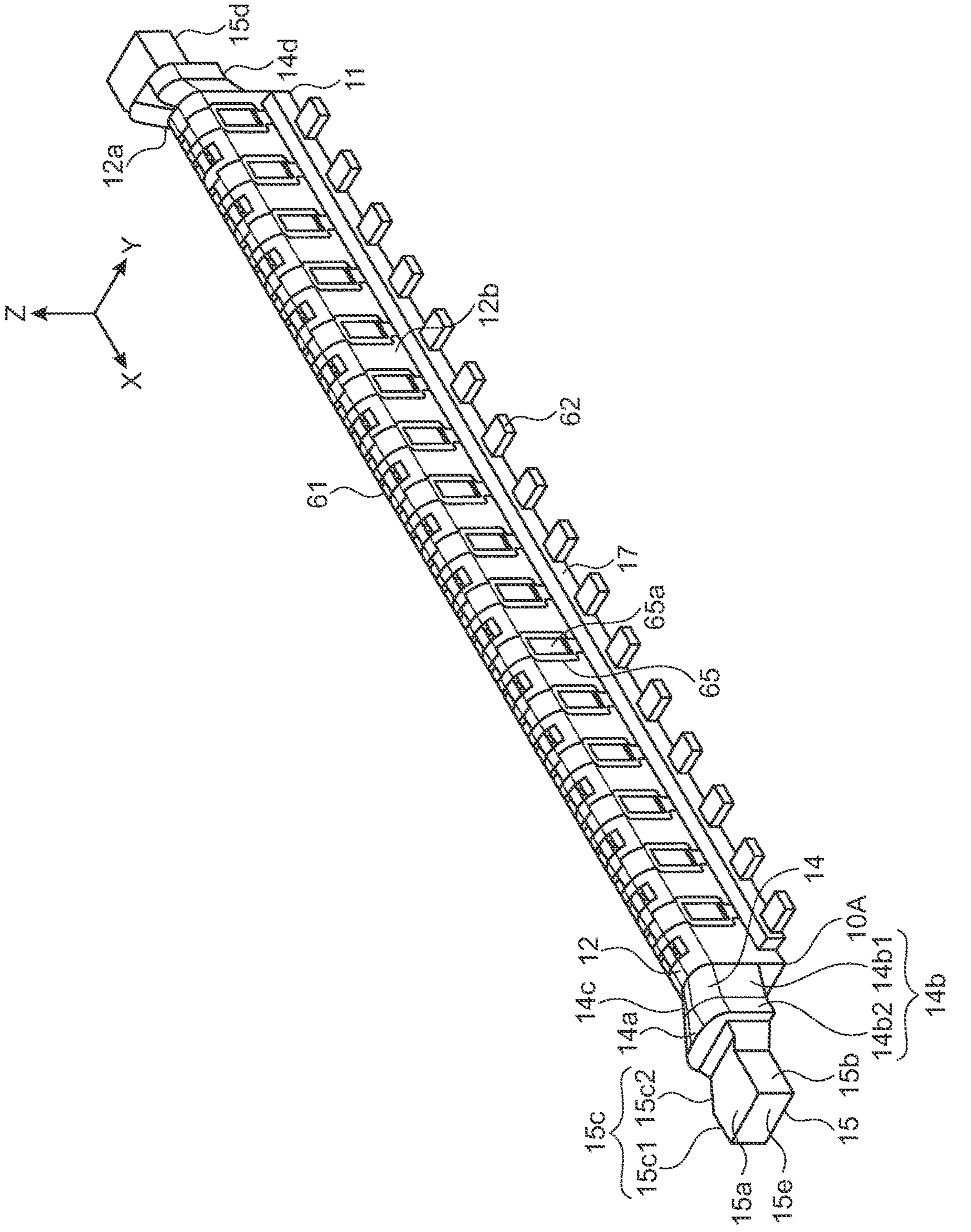
FIG. 3 is a perspective view illustrating a left half body part of the first connector according to the present embodiment.

FIG. 1 is a perspective view illustrating a first connector according to the present embodiment, FIG. 2 is an exploded view illustrating the first connector according to the present embodiment, and FIG. 3 is a perspective view illustrating a left half body part of the first connector according to the present embodiment.

In the figures, 1 is a first connector serving as one of a pair of board to board connectors according to the present embodiment. The first connector 1 is a surface mount type connector mounted on the surface of a first substrate (not illustrated) serving as a mounting member and is mated with a second connector 101 serving as a counterpart connector. Furthermore, the second connector 101 is the other of the pair of board to board connectors and is a surface mount type connector mounted on the surface of a second substrate (not illustrated) serving as a mounting member.

Note that while the first connector 1 and the second connector 101 are ideally used for electrically connecting the first substrate and the second substrate serving as substrates, the connectors can also be used to electrically connect other members. Examples of the first substrate and the second substrate include printed circuit boards, flexible flat cables (FFC), flexible printed circuit boards (FPC), etc. used in electronic equipment, etc., but may be any type of substrate.

Furthermore, expressions indicating directions such as up, down, left, right, front, and back used to describe the operations and configurations of the parts of the first connector 1 and the second connector 101 in the present embodiment are not absolute, but rather relative directions, and though appropriate when the parts of the first connector 1 and the second connector 101 are in the positions illustrated in the figures, these directions should be interpreted differently when these positions change in order to correspond to said change.

The first connector 1 is configured by connecting a pair of left and right half body parts, that is, a left half body part 10A and a right half body part 10B to each other using a first reinforcing bracket 51 as a reinforcing bracket and a covering part 16 integrally molded by a molding method referred to as overmolding, outsert molding, or insert molding (hereinafter referred to as "insert molding"). Note that the left half body part 10A and the right half body part 10B are identical members disposed so as to face each other and thus, when collectively described, they are described as half body parts 10. The left half body part 10A and the right half body part 10B are substantially gate-shaped in plan view (shape projected onto the X-Y surface), and a space between the connected left half body part 10A and right half body part 10B is an elongated recessed groove 13 extending in the longitudinal direction (X axis direction) of the first connector 1. The recessed groove 13 is a though-hole opened on the upper surface and lower surface of the first connector 1.

Note that, in the present embodiment, for convenience of explanation, in the first connector 1, a pair of, that is, two half body parts 10 are arranged in parallel, however, three or more half body parts 10 may be arranged in parallel. The half body parts 10 need not be substantially gate-shaped, and may have any shape provided that both ends of the longitudinal direction can be connected to each other with the first reinforcing bracket 51 and the covering part 16.

The half body parts 10 are integrally formed from an insulating material such as a synthetic resin or the like, and have a first housing 11 that is a substantially gate-shaped connector body in the plan view. Each of the first housing 11 includes an elongated band-like bottom plate part 17 that extends in the longitudinal direction (X-axis direction) of this first housing 11, and an elongated first protrusion 12 as an elongated protrusion that is integrally formed on the upper surface of the bottom plate part 17 and extends in the longitudinal direction of the first housing 11. The first protrusion 12 is a member having an inverted U-shaped cross section, and has a curved mating surface 12*a* located on the upper side (Z-axis positive direction side), and an outer surface 12*b* and inner surface 12*c*, which are connected to both left and right sides of the mating surface 12*a*. The outer surface 12*b* and the inner surface 12*c* are a pair of flat surfaces that face each other in parallel, and extend in the longitudinal direction of the first housing 11. Note that the dimensions of the first protrusion 12 in the width direction (Y axis direction) are smaller than the dimensions of the bottom plate part 17 in the width direction, and thus, the bottom plate part 17 protrudes outward in the width direction from the outer surface 12*b* and the inner surface 12*c* at the lower end (end in the Z-axis negative direction side) of the first protrusion 12. Furthermore, the lower surface of the bottom plate part 17 is a mounting surface 17*a* of the first housing 11, which faces the surface of the first substrate.

A first terminal 61 as a terminal is disposed in each first protrusion 12. The plurality of (32 in the example illustrated in the figures) first terminals 61 is arranged at a prescribed pitch. The first terminal 61 is a member integrally formed by applying a process such as punching, bending, or the like to a conductive metal plate, and includes a body part 63 that extends in the width direction of the first protrusion 12, a tail part 62 connected to one end of the body part 63, a contact part 65 that is bent by approximately 90 degrees, connected to the other end of the body part 63, and vertically extends, and an upper end part 64 that is bent by approximately 90 degrees and connected to the upper end of the contact part 65.

The body part 63 is the part embedded and retained in the bottom plate part 17. In addition, the tail part 62 extends outward from the bottom plate part 17 in the width direction, and is connected to the connection pad coupled to the conductive trace on the first substrate by soldering or the like. Note that the conductive trace is typically a signal line. The contact part 65 is a part that comes into contact with a second terminal 161 described below of the second connector 101 when the first connector 1 is mated with the second connector 101, and preferably includes a contact recess 65*a* dented from the surface.

The first terminals 61 are integrated with the first housing 11 by insert molding. That is, first housing 11 is molded by filling the cavity of a mold, in which first terminal 61 has been set beforehand, with an insulating material. Thus, the first terminal 61 is integrally attached to the first housing 11 in the state where with the lower surfaces of the body part 63 and tail part 62 are exposed to the mounting surface 17*a* of the bottom plate part 17, and the surfaces of the contact part 65 and upper end part 64 are exposed on the outer surface 12*b* or the inner surface 12*c* and mating surface 12*a* of the first protrusion 12.

In addition, the first terminals 61 attached to each first protrusion 12 are oriented such that the adjacent first terminals face opposite to each other in the width direction of the first protrusion 12. In the illustrated example, the first terminal 61 located at the front end (end in the X-axis positive direction) among the first terminals 61 attached to the first protrusion 12 of the left half body part 10A is oriented such that the tail part 62 protrudes outward (in the Y-axis positive direction), while the first terminal 61 located the second from the front end is oriented such that the tail part 62 protrudes inward (in the Y-axis negative direction). In this manner, since the first terminals 61 are attached to the first protrusion 12 so as to be alternately oriented in opposite directions, the pitch of the tail parts 62 that protrude from each of both sides of the first protrusion 12 is twice the pitch of the first terminals 61. Therefore, connection work by soldering and the like to the connection pad of the first substrate can easily be performed. In addition, the pitch of the contact part 65 exposed on the outer surface 12 of the first protrusion 12*b*, and the pitch of the contact part 65 exposed on the inner surface 12*c* are also twice the pitch of the first terminals 61.

Furthermore, the first terminals 61 are members integrated with the first housing 11 by insert molding, and thus are not separated from the first housing 11. However, note that the first terminals are drawn separately from the first housing 11 in FIG. 2 for convenience of explanation.

A first protruding end part 18 that is a body end part functioning as a mating guide part is disposed on both ends in the longitudinal direction of the first protrusion 12. The first protruding end part 18 is a member connected to both ends in the longitudinal direction of each first protrusion 12, and is formed to connect the left half body part 10A to the right half body part 10B. In the state where the first connector 1 is mated with the second connector 101, the first protruding end part 18 functions as an insertion protrusion inserted into the mating recess 122 of a second protruding end part 121 described below of the second connector 101.

The first protruding end part 18 is constituted of an extended end part 14 and an embedded part 15 of the left and right half body parts 10, and of covering part 16 and the first reinforcing bracket 51.

The extended end part 14 extending in the longitudinal direction is integrally connected to both ends in the longitudinal direction of the first protrusion 12 of each of the half body parts 10, and the embedded part 15 further extending in the longitudinal direction of the first protrusion 12 is integrally connected to each extended end part 14. Note that the extended end part 14 diagonally extends inward, and the embedded part 15 extends in the longitudinal direction from an inwardly-eccentric position at the tip of the extended end part 14, and is located inward of the outer surface 12*b* of the first protrusion 12. That is, the extended end part 14 of the left half body part 10A diagonally extends in the right direction (the Y-axis negative direction), and the embedded part 15 extends in the longitudinal direction from a rightward-eccentric position at the tip of the extended end part 14. In addition, the extended end part 14 of the right half body part 10B diagonally extends in the left direction (the Y-axis positive direction), and the embedded part 15 extends in the longitudinal direction from a leftward-eccentric position at the tip of the extended end part 14.

At least a part of the extended end parts 14 and the whole of the embedded parts 15 of the left and right half body parts 10 are covered with the covering part 16 formed from an insulating material such as a synthetic resin or the like. Specifically, the covering part 16 is formed by bringing the embedded parts 15 of the left and right half body parts 10 into proximity with each other, being covered with first reinforcing bracket 51, and insert-molded. As a result, the extended end parts 14 and the embedded parts 15 of the left and right half body parts 10, the covering part 16 and the first reinforcing bracket 51 are integrated to form the first protruding end part 18, thereby connecting the left and right half body parts 10 to each other. However, the covering part 16 does not necessarily cover the whole of the embedded parts 15, and may cover the embedded parts 15 to a degree sufficient to connect the left and right half body parts 10 to each other, however, in order to maximize the coupling force, it is desirable to cover the entire embedded part 15. Note that the covering part 16 is a member integrated with other members by insert molding and is not independently present while separated from the other members, and however, for convenience of explanation, is depicted as independently present in FIG. 2.

As illustrated in FIG. 3, the extended end part 14 has an upper surface 14*a* located on the upper side, an outer surface 14*b* and an inner surface 14*c* that are connected to left and right sides of the upper surface 14*a*, and a lower surface 14*d* located on the lower side. The lower surface 14*d* is located above the mounting surface 17*a*, and at least a part of the lower surface 14*d* is covered with the covering part 16. The upper surface 14*a* is substantially flush with the mating surface 12*a* of the first protrusion 12. Additionally, the inner surface 14*c* is a surface diagonally inclined inward with respect to the inner surface 12*c* of the first protrusion 12. The outer surface 14*b* includes an inclined outer surface 14*b*1 diagonally inclined inward with respect to the outer surface 12*b* of the first protrusion 12, and a parallel outer surface 14*b*2 that is substantially parallel to the outer surface 12*b* of the first protrusion 12. The parallel outer surface 14*b*2 is substantially flush with the outer surface of the covering part 16 and becomes a part of the outer surface of the first protruding end part 18.

The embedded part 15 is a member substantially shaped like a rectangular parallelepiped, and has an upper surface 15*a* located on the upper side, an outer surface 15*b* and an inner surface 15*c* on both left and right sides, a lower surface 15*d* located on the lower side, and end surfaces 15*e* at both ends in the longitudinal direction of the first connector 1. The upper surface 15*a* and the lower surface 15*d* are planes that are parallel to each other, and the distance between the upper surface 15*a* and the lower surface 15*d*, that is, the thickness of the embedded part 15 is smaller than the thickness of the extended end part 14 and the first protrusion 12. Note that the upper surface 15*a* is located below the mating surface 12*a*, and the lower surface 15*d* is located above the mounting surface 17*a*. Further, the outer surface 15*b* is a plane that is substantially parallel to the outer surface 12*b* of the first protrusion 12, but is located inward of the outer surface 12*b*, that is, close to the center in the width direction of the first housing 11. The inner surface 15*c* includes a parallel inner surface 15*c*1 that is substantially parallel to the inner surface 12*c* of the first protrusion 12, and an inclined inner surface 15*c*2 that is substantially parallel to the inner surface 14*c* of the extended end part 14. The end surface 15*e* is a plane that is orthogonal to the longitudinal direction of the first connector 1. The embedded part 15 is entirely covered with the covering part 16, that is, embedded in the covering part 16.

In this way, since the extended end part 14 diagonally extends inward and the embedded part 15 is located inner from the outer surface 12*b* of the first protrusion 12, the width (dimension in the Y-axis direction) of the first protruding end part 18 can be made smaller than the width of the first connector 1 (distance between the outer surfaces 12*b* of the left and right first protrusions 12). Note that in the case where the width of the first protruding end part 18 need not be smaller than the width of the first connector 1, the extended end part 14 is not necessarily inclined inward, but can also be extended straightly. Furthermore, the extended end part 14 may be omitted by extending the embedded part 15 directly from both ends in the longitudinal direction of the first protrusion 12. In this case, the dimension of the first connector 1 in the longitudinal direction can be reduced. Furthermore, when three or more half body parts 10 are arranged in parallel, the extended end part 14 can be extended into a Y-shape from both ends in the longitudinal direction of the first protrusion 12.

The first reinforcing bracket 51 is a member integrally formed by applying a process such as punching, bending, or the like to a metal plate, and includes a substantially rectangular upper plate 54 that extends in the width direction of the first housing 11, substantially rectangular legs 55 that are connected to both left and right edges of the upper plate 54 and extend downward, and an end wall outer surface covering part 52 and an end wall inner surface covering part 53 that are connected to both front and back edges of the upper plate 54, respectively, and extend downward. A tail part 52*a* is connected to the lower end of the end wall outer surface covering part 52. The width of the end wall outer surface covering part 52 is greater than the width of the end wall inner surface covering part 53.

As described above, the first reinforcing bracket 51 is integrated with the covering part 16 to constitute the first protruding end part 18. Then, the upper plate 54 is embedded in the upper surface of the first protruding end part 18, and the upper surface of the upper plate 54 is flush with the upper surface of the covering part 16 to constitute most of the upper surface of the first protruding end part 18. Also, the left and right legs 55 are embedded in the left and right outer surfaces of the first protruding end part 18, respectively, and the outer surfaces of the legs 55 are flush with the outer surface of the covering part 16 to constitute most of the outer surface of the first protruding end part 18. In addition, the end wall outer surface covering part 52 and the end wall inner surface covering part 53 are embedded in the end wall outer surface and the end wall inner surface, respectively, of the first protruding end part 18, and the outer surfaces of the end wall outer surface covering part 52 and the end wall inner surface covering part 53 are flush with the end wall outer surface and the end wall inner surface of the covering part 16 to constitute most of the end wall outer surface and the end wall inner surface of the first protruding end part 18.

The tail part 52*a* is bent by approximately 90 degrees and connected to the lower end of the end wall outer surface covering part 52, extends outward in the longitudinal direction of the first housing 11, and is connected to the connection pad coupled with the conductive trace on the first substrate by soldering or the like. The conductive trace is typically a power line. Note that, as necessary, the lower ends of the legs 55 may approach or contact the surface of the first substrate. In this case, connecting, the connection strength of the first reinforcing bracket 51 to the first substrate is improved by connecting the lower ends of the legs 55 to the connection pad on the first substrate by soldering, or the like.

The operation of manufacturing the first connector 1 having the abovementioned configuration will be described below.

Figure 4:
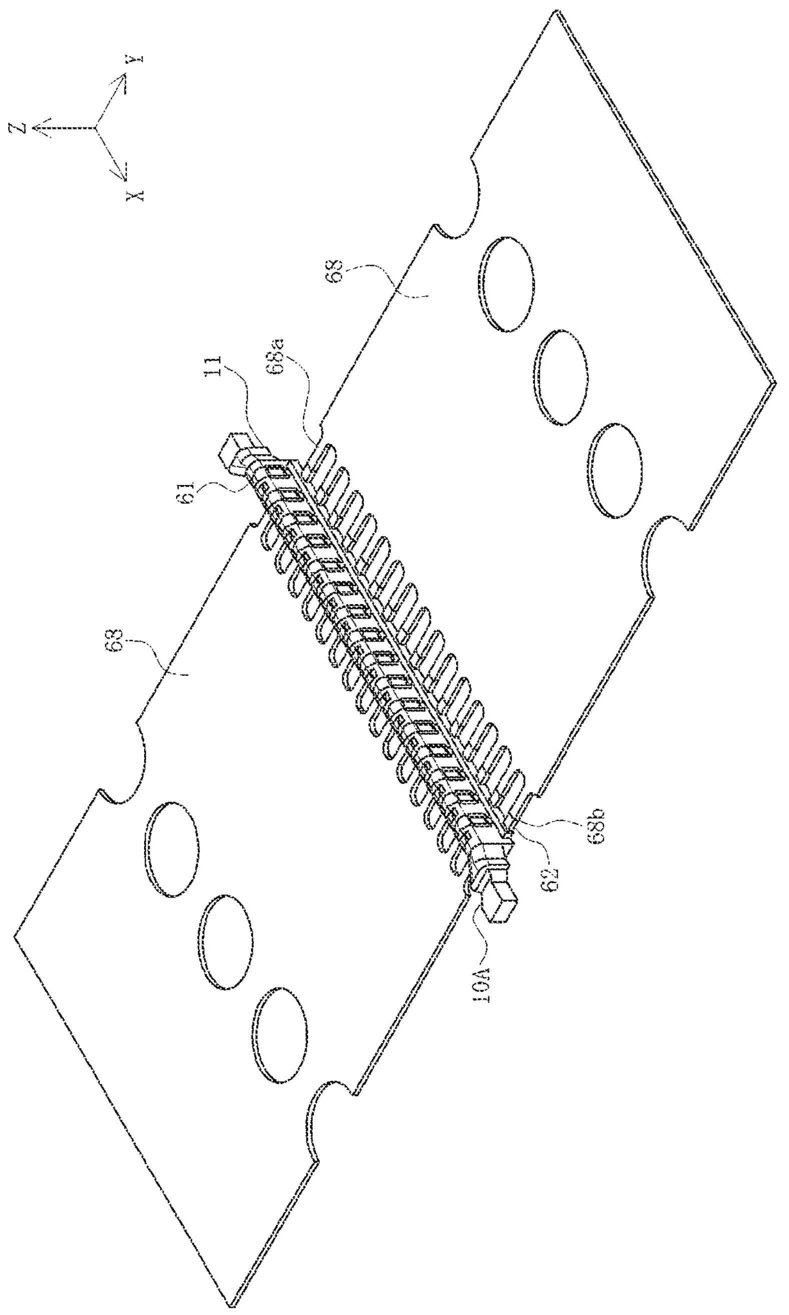
FIG. 4 is a perspective view illustrating a first step of manufacturing the left half body part of the first connector according to the present embodiment.
Figure 5A:
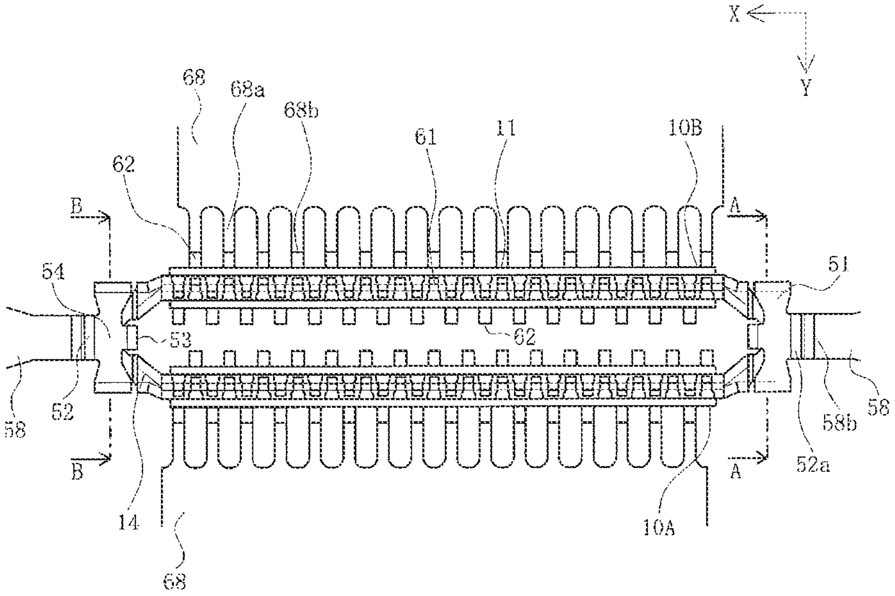
Figure 5B:
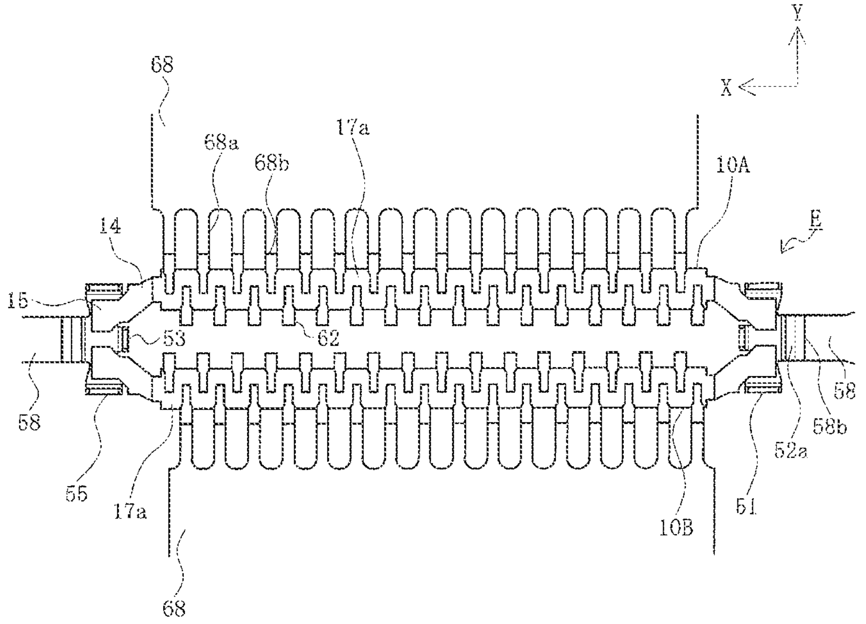
Figure 6A:
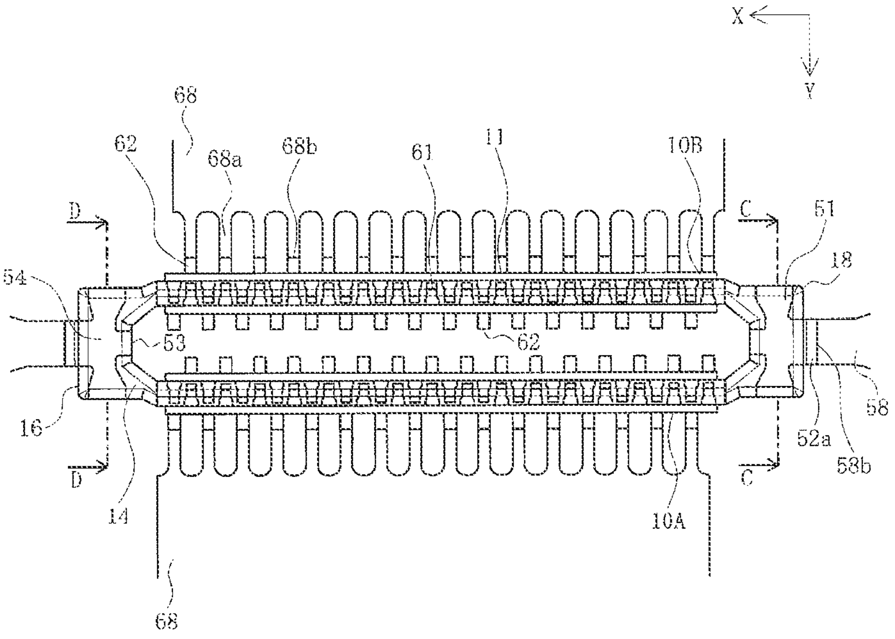
Figure 6B:
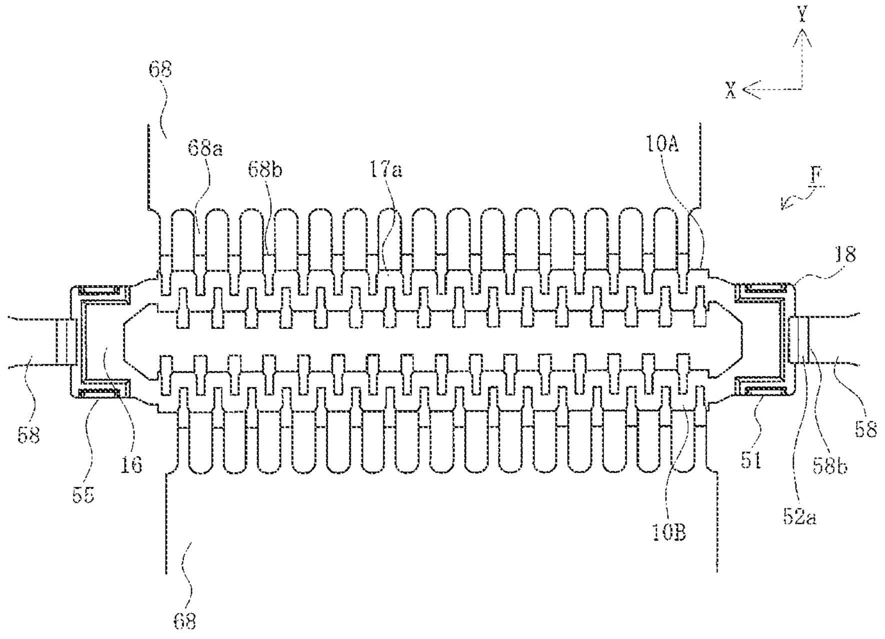
Figure 7A:
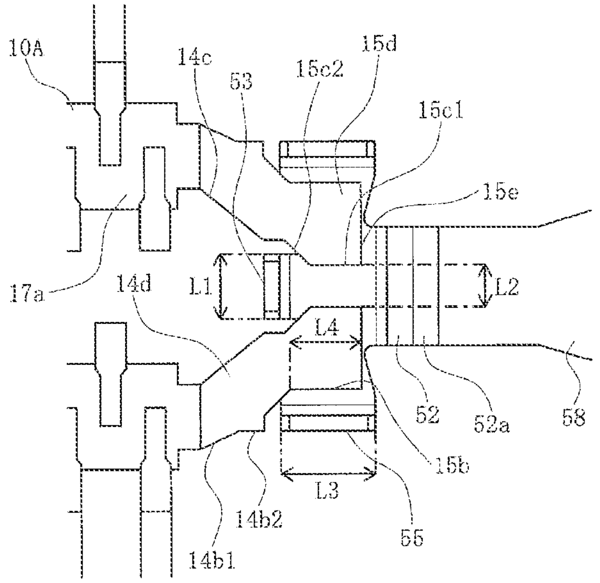
Figure 7B:
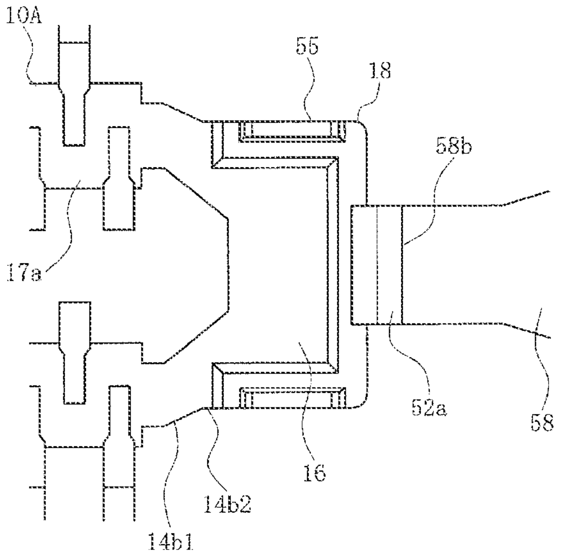
Figure 8A:
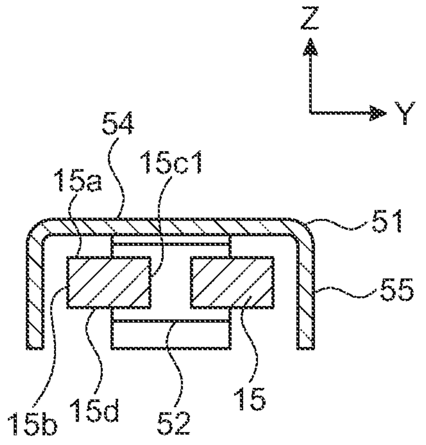
Figure 8B:
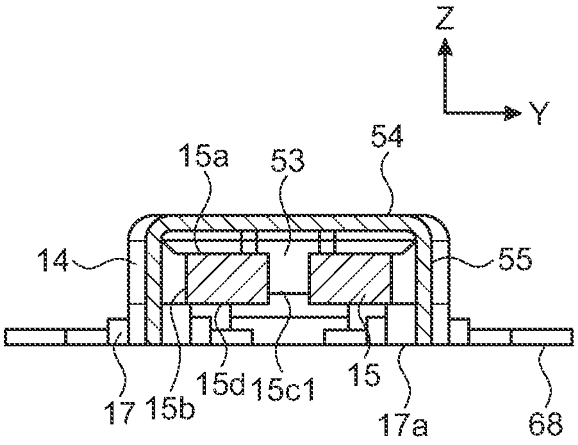
Figure 8C:
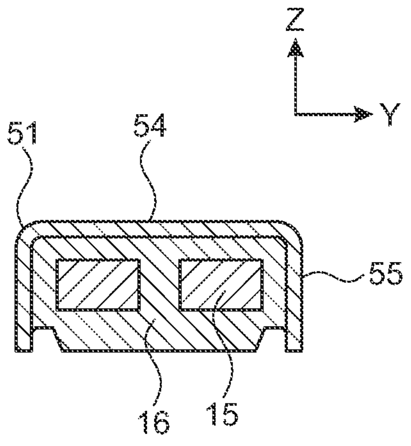
Figure 8D:
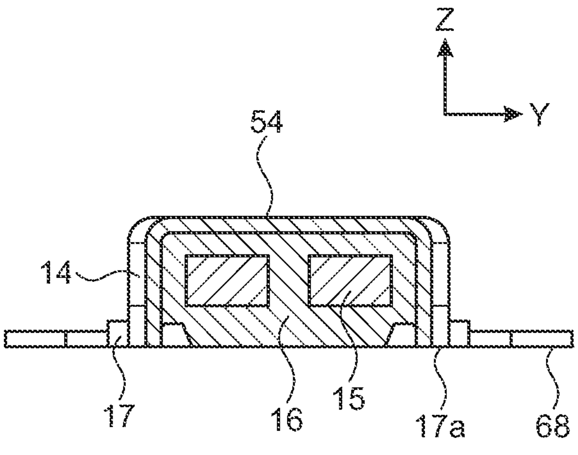

FIG. 4 is a perspective view illustrating a first step of manufacturing the left half body part of the first connector according to the present embodiment, FIGS. 5A and 5B are two-sided views illustrating a first step of manufacturing the first protruding end part of the first connector according to the present embodiment, FIGS. 6A and 6B are two-sided views illustrating a second step of manufacturing the first protruding end part of the first connector according to the present embodiment, FIGS. 7A and 7B are enlarged views illustrating main parts of the first and second steps of manufacturing the first protruding end part of the first connector according to the present embodiment, and FIGS. 8A to 8D are cross-sectional views illustrating the first and second steps of manufacturing the first protruding end part of the first connector according to the present embodiment. Note that FIGS. 5A and 6A are top views, FIGS. 5B and 6B are bottom views, FIG. 7A is an enlarged view illustrating a part E in FIG. 5B, FIG. 7B is an enlarged view illustrating the F part in FIG. 6B, FIG. 8A is a cross-sectional view taken along a line A-A in FIG. 5A, FIG. 8B is a cross sectional view taken along line B-B in FIG. 5A, FIG. 8C is a cross sectional view taken along a line C-C in FIG. 6A, and FIG. 8D is a cross-sectional view taken along a line D-D in FIG. 6A.

The first terminal 61 is a member made from a metal plate bent in the plate thickness direction, and is fabricated by applying a process such as punching, bending, or the like to the metal plate, and as illustrated in FIG. 4, the plurality of first terminals 61 connected to a flat plate-shaped terminal carrier 68 is supplied. Note that the first terminals 61 each are a member as illustrated in FIG. 2 connecting the tip of the tail part 62 to the terminal carrier 68 via an elongated connection arm 68*a* and cutting the tail part 62 away from the connection arm 68*a* at a cutting part 68*b*.

Then, in the step of being integrated with the first housing 11 by insert molding, the plurality of first terminals 61 connected to the carrier 68 are supplied as illustrated in FIG. 4. FIG. 4 illustrates the example of manufacturing the left half body part 10A. In this case, the first terminals 61 oriented such that the tail parts 62 protrude outward (side in the Y-axis positive direction) are connected to the right terminal carrier 68 in FIG. 4, and the first terminals 61 oriented such that the tail parts 62 protrude outward (side in the Y-axis negative direction) are connected to the left terminal carrier 68 in FIG. 4, and these terminals in that state are set in a primary mold not illustrated. The plurality of first terminals 61 is simultaneously positioned and set in the mold by holding and operating the terminal carrier 68 to which the plurality of first terminals 61 is connected.

Subsequently, a molten insulating material such as a synthetic resin is filled in the cavity of the mold. In other words, the primary insert molding is performed. Note that the insulating material may be any type of material, but is here an LCP (liquid crystal polymer). In the primary insert molding, it is desirable to select the material in terms of flowability. Then, when the filled insulating material is cooled and solidified to form the first housing 11, the mold is opened, and the left half body part 10A with the terminal carrier 68 connected to the first terminals 61 as illustrated in FIG. 4 is removed. Similarly, the right half body part 10B with the terminal carrier 68 connected to the first terminals 61 is also manufactured.

Subsequently, only the terminal carrier 68 (the left terminal carrier 68 in FIG. 4) connected to the tail parts 62 protruding inward is removed from the left half body part 10A with the terminal carrier 68 connected to the first terminals 61 as illustrated in FIG. 4, and the terminal carrier 68 (the right terminal carrier 68 in FIG. 4) connected to the tail parts 62 protruding outward is left as it is. Similarly, only the terminal carrier 68 connected to the tail parts 62 protruding inward from the right half body part 10B with the terminal carrier 68 connected to the first terminals 61 is removed, and the terminal carrier 68 connected to the tail parts 62 protruding outward is left as it is.

Subsequently, as illustrated in FIGS. 5A and 5B, the left half body part 10A and the right half body part 10B with the terminal carriers 68 connected only to the tail parts 62 protruding outward are set in a secondary mold (not illustrated) so as to be opposed to each other. Specifically, the inner sides of the left and right half body parts 10 face each other, and the first housings 11 of the left and right half body parts 10 are parallel to each other, the mounting surfaces 17*a* of the first housing 11 of the left and right half body parts 10 are flush with each other, the end surfaces 15*e* of both ends in the longitudinal direction are flush with each other, and the embedded parts 15 of the left and right half body parts 10 are adjacent to each other but are not in contact. As illustrated in FIG. 7A, the opposed left and right half body parts 10 are located such that the spacing between the parallel inner surfaces 15*c*1 of the opposed embedded part 15 is a predetermined distance L2, and are set in a secondary mold.

Furthermore, the first reinforcing bracket 51 is set in the secondary mold so as to cover at least a part of the extended end parts 14 and the entire embedded parts 15 of the left and right half body parts 10. In this case, the first reinforcing bracket 51 is set in the state where a tip of a tail part 52*a* is connected to a bracket carrier 58 as a carrier. Note that the tail part 52*a* is removed from the bracket carrier 58 at a cutting part 58*b* to obtain the first reinforcing bracket 51 as illustrated in FIG. 2. Specifically, as illustrated in FIGS. 7A, 8A, and 8B, the first reinforcing bracket 51 is set such that the upper plate 54 and the upper surface 15*a* of the embedded part 15 have a gap therebetween, the leg 55 and the outer surface 15*b* of the embedded part 15 have a gap therebetween, the end wall outer surface covering part 52 and the end surfaces 15*e* of the embedded part 15 have a gap therebetween, the end wall inner surface covering part 53 and the inclined inner surface 15*c*2 of the embedded part 15 have a gap therebetween, and the lower end of the leg 55 is located lower than the lower surface 15*d* of the embedded part 15 and at the approximately same height as the mounting surface 17*a*.

Subsequently, a molten insulating material such as a synthetic resin is filled in the cavity of the mold. In other words, the secondary insert molding is performed. Note that the insulating material may be any type of material, but here, the material is LCP in consideration of fluidity as in the primary insert molding. In the secondary insert molding, the insulating material may be selected by focusing on strength and melt bonding with the insulating material of the primary insert molding. Then, when the filled insulating material is cooled and solidified to form the covering part 16, the mold is opened, and the left and right half body parts 10 having both ends in the longitudinal direction connected to each other with the first protruding end part 18 as illustrated in FIGS. 6A and 6B are taken out.

In this case, the left and right half body parts 10 are integrated with the covering part 16 in the state where at least a part of the extended end part 14 and the entire embedded part 15 are covered with the covering part 16, and the first reinforcing bracket 51 is integrated with the covering part 16 so as to cover at least a part of the outer surface of the covering part 16. Specifically, as illustrated in FIGS. 7B, 8C, and 8D, in the first reinforcing bracket 51, the gap between the upper plate 54, the leg 55, the end wall outer surface covering part 52, and the end wall inner surface covering part 53, and the top surface 15*a*, the outer surface 15*b*, the end surface 15*e*, and the inclined inner surface 15*c*2 of the embedded part 15 is filled with the insulating material of the covering part 16. The gap between the parallel inner surfaces 15*c*1 of the embedded parts 15 facing each other is also filled by the insulating material of the covering part 16. Furthermore, the lower side of the lower surface 15*d* of the embedded part 15 is also filled by the insulating material of the covering part 16, and the lower surface of the covering part 16 is substantially flush with the mounting surface 17*a*. Furthermore, the parallel outer surface 14*b*2 of the extended end part 14 is substantially flush with the outer surface of the covering part 16 and becomes a part of the outer surface of the first protruding end part 18.

As illustrated in FIG. 7A, since there is a gap between the end wall inner surface covering part 53 of the first reinforcing bracket 51 and the inclined inner surface 15*c*2 of the embedded part 15, and the inclined inner surface 15*c*2 is inclined, the molten insulating material filled into the cavity of the mold in the secondary insert molding smoothly flows between the end wall inner surface covering part 53 and the left and right inclined inner surfaces 15*c*2 and between the parallel inner surfaces 15*c*1 of the opposed embedded part 15, filling the cavity without any gap. Furthermore, the space between the end wall inner surface covering part 53 and the left and right inclined inner surfaces 15*c*2 increase, increasing the filling amount of the insulating material.

Additionally, as illustrated in FIG. 7A, it is desirable that the dimension in the width direction of the first connector 1 in the end wall inner surface covering part 53 of the first reinforcing bracket 51 opposed to the gap between the parallel inner surfaces 15$c$1 of the embedded part 15, that is, a width L1 is set to be larger than a distance L2 that is the spacing between the parallel inner surfaces 15$c$1. In other words, it is preferable that L1 is larger than L2. Note that the width of the end wall outer surface covering part 52 is greater than the width of the end wall inner surface covering part 53. As a result, the boundary between the parallel inner surface 15$c$1 of the embedded part 15 formed by the primary insert molding and the covering part 16 formed by the secondary insert molding is covered with the end wall outer surface covering part 52 and the end wall inner surface covering part 53 as viewed from the front-rear direction (X-axis direction) and thus, is hard to be separated, increasing the strength of the first protruding end part 18.

Furthermore, as illustrated in FIG. 7A, it is preferable that the dimension in the longitudinal direction of the first connector 1 in the leg 55 of the first reinforcing bracket 51, that is, a length L3 is set to be larger than a length L4 of the outer surface 15*b* of the embedded part 15. In other words, it is preferable that L3 is larger than L4. The end of the outer surface 15*b* near the center in the longitudinal direction of the first connector 1 is preferably located closer to both ends in the longitudinal direction of the first connector 1 than the end of the legs 55 in the longitudinal direction of the first connector 1. As a result, the boundary between the outer surface 15*b* of the embedded part 15 formed by the primary insert molding and the covering part 16 formed by the secondary insert molding is seen from the width direction (Y-axis direction) and is covered by the legs 55, and thus the strength of the first protruding end part 18 is improved.

Furthermore, the embedded part 15 is disposed so as to at least partially overlap with, that is, stack on any of the upper plate 54, the end wall outer surface covering part 52, the end wall inner surface covering part 53, and the leg 55 of the first reinforcing bracket 51 when viewed both in the vertical direction (width direction) and in the front-back direction (longitudinal direction). Thus, the strength of the first protruding end part 18 is increased.

Finally, the remaining terminal carrier 68 and the bracket carrier 58 are cut away from the left and right half body parts 10 with the both ends in the longitudinal direction connected to each other with the first protruding end part 18 as illustrated in FIGS. 6A and 6B. Thus, the first connector 1 as illustrated in FIG. 1 can be obtained.

Next, the configuration of the second connector 101 that forms a connector pair with the first connector 1 and the operation of mating the first connector 1 with the second connector 101 will be described.

Figure 9:
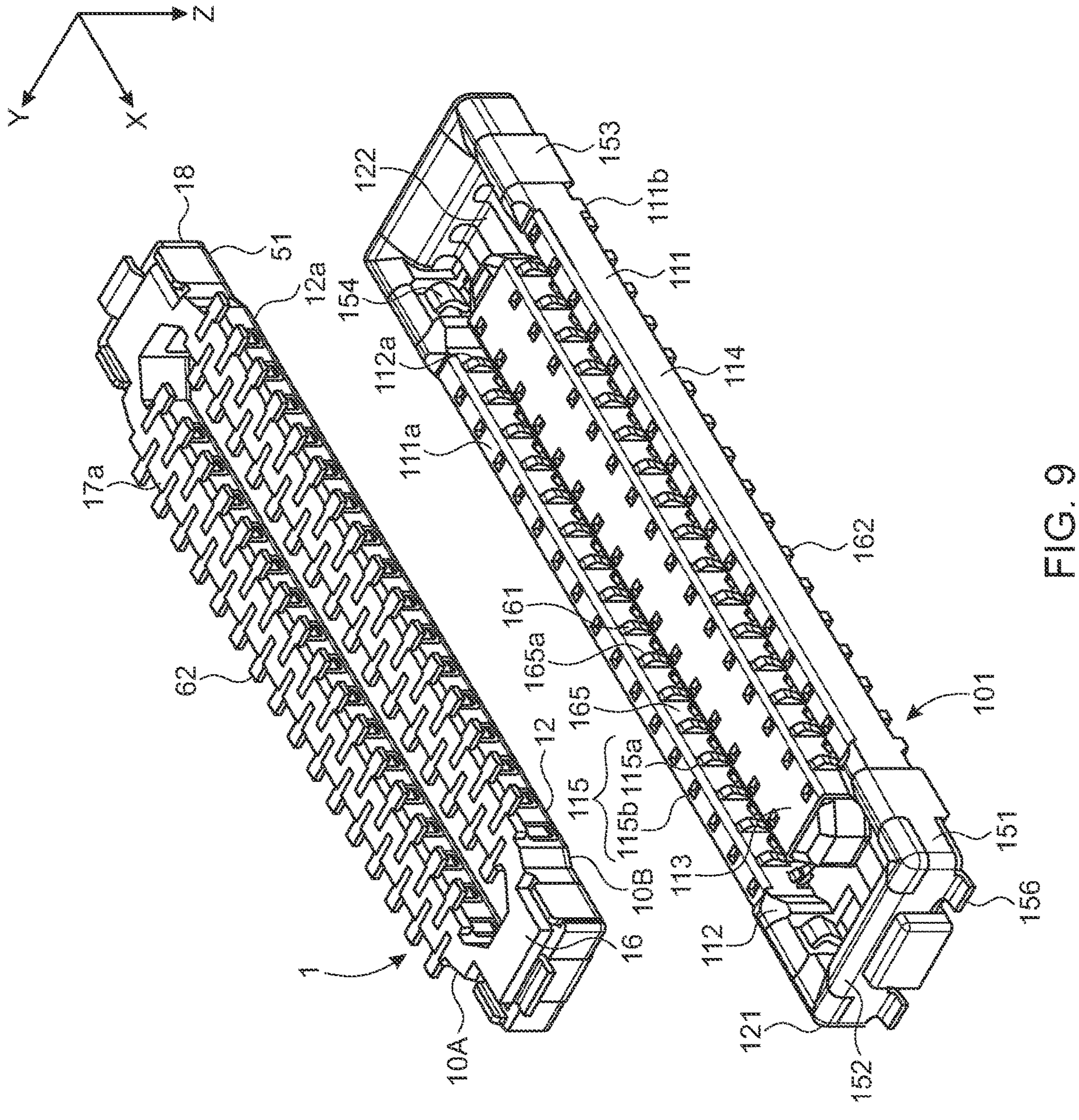
FIG. 9 is a perspective view illustrating the state immediately before mating of the first connector with the second connector according to the present embodiment when viewed from the first connector side.

FIG. 9 is a perspective view illustrating the state immediately before mating of the first connector with the second connector according to the present embodiment when viewed from the first connector side.

The second connector 101 as a counterpart connector according to the present embodiment has the second housing 111 as a counterpart connector body integrally formed of an insulating material such as synthetic resin. As illustrated in the figure, this second housing 111 is a substantially rectangular body with the shape of a substantially rectangular thick plate. A substantially rectangular enclosed recess 112 to be mated with the first housing 11 is formed on the side where the first connector 1 of the second housing 111 is fitted into, that is, the side of the mating surface 111*a* (side in the Z-axis positive direction). A second protrusion 113 that is an island part mating with the recessed groove 13 is integrally formed with the second housing 111 in the recess 112, and side wall parts 114 extending in parallel with the second protrusion 113 are integrally formed with the second housing 111 on both sides of the second protrusion 113.

The second protrusion 113 and the side wall part 114 protrude upward (in the Z-axis positive direction) from the bottom surface of the recess 112, and extend in the longitudinal direction of the second connector 101. Therefore, a recessed groove 112*a* that is an elongated recess extending in the longitudinal direction (X-axis direction) of the second connector 101 is formed as a part of the recess 112 on each side of the second protrusion 113.

Second terminal housing groove cavities 115*a* in the shape of recessed grooves for housing the respective second terminals 161 are formed on the surfaces of both sides of the second protrusion 113 and the inner surface of the side wall part 114. In addition, second terminal housing hole cavities 115*b* in the shape of holes for housing the respective second terminals 161 are formed on the second protrusion 113 and the side wall part 114. Since the second terminal housing groove cavities 115*a* and the second terminal housing hole cavities 115*b* are integrated with each other on the bottom surface of the recessed groove 112*a*, when the second terminal housing groove cavities 115*a* and the second terminal housing hole cavities 115*b* are collectively described, they will be described as the second terminal housing cavities 115. The second terminal housing cavities 115 corresponding to the number of the first terminals 61 are disposed at a pitch corresponding to the first terminals.

The second terminal 161 is a member integrally formed by applying a process such as punching or the like to a conductive metal plate, and includes a body part (not illustrated), a tail part 162 connected to the lower end of the body part, a connection part that extend in the width direction (Y-axis direction) of the second connector 101 from the vicinity of the lower end of the body part, and a contact part 165 that extends upward (Z-axis positive direction) from that connection part. It is preferable that a contact protrusion 165*a* that protrudes toward the body part is formed near the tip of the contact part 165.

The body part is a part that is press-fit and retained in the second terminal housing hole cavity 115*b*. In addition, the tail part 162 is bent and connected to the lower end of the body part, extends in the width direction of the second housing 111, and is connected to the connection pad coupled to the conductive trace on the second substrate by soldering or the like. Note that the conductive trace is typically a signal line. Furthermore, the contact part 165 is a part that contacts the first terminal 61 equipped on the first connector 1 when the first connector 1 is mated with the second connector 101, and the contact protrusion 165*a* preferably engages with the contact recess 65*a* formed on the contact part 65 of the first terminal 61.

The second terminal 161 is inserted into the second terminal housing cavity 115 from below the second housing 111 and attached to the second housing 111. Thus, the body part of the second terminal 161 is press-fit and retained in the second terminal housing hole cavity 115*b*, the contact part 165 is housed in the second terminal housing groove cavity 115*a* and exposed on the recessed groove 112*a*, and the lower surface of the tail part 162 is exposed on the mounting surface 111*b* that is the lower surface of the second housing 111.

In addition, similar to the first terminals 61, the second terminals 161 attached to each recessed groove 112*a* are oriented such that the adjacent second terminals are opposed to each other in the width direction of the recessed groove 112*a*. In the examples illustrated in FIG. 9, the second terminal 161 located on the front end (end in the X-axis positive direction) among the second terminals 161 attached to the recessed groove 112*a* on the side in the Y-axis positive direction is oriented such that the tail part 162 projects in the Y-axis negative direction, while the second terminal 161 located the second from the front end is oriented such that the tail part 162 projects in the Y-axis positive direction. In this manner, since the second terminals 161 are attached to the recessed groove 112*a* so as to be alternately oriented in opposite directions, the pitch of the tail parts 162 exposed on the mounting surface 111*b* on both sides of the recessed groove 112*a* is set to twice the pitch of the second terminals 161. Therefore, connection work by soldering or the like to the connection pad of the second substrate can easily be performed. The pitch of the contact parts 165 exposed on the recessed groove 112*a* is also set to twice the pitch of the second terminals 161.

Second protruding end parts 121 as mating guide parts are disposed on both ends in the longitudinal direction of the second housing 111. A mating recess 122 that is a part of the recess 112 is formed on each of the second protruding end parts 121. The mating recess 122 is a substantially rectangular recess connected to both ends in the longitudinal direction of each recessed groove 112*a*. In the state where the first connector 1 is mated with the second connector 101, the first protruding end part 18 of the first connector 1 is inserted into the mating recess 122. A second reinforcement bracket 151 that is a counterpart bracket is attached to the second protruding end part 121. The second reinforcement bracket 151 is integrated with the second housing 111 by insert molding.

The second reinforcement bracket 151 is a part integrally formed by applying a process such as punching, bending, or the like to a metal plate, and includes a second body part 152 that extends in the width direction of the second housing 111, a side covering part 153 connected to both left and right ends of the second body part 152, contact side parts 154 disposed on left and right inner walls of the mating recess 122, and a tail part 156 connected to the lower end of the second body part 152. The tail part 156 extends outward in the longitudinal direction of the second connector 101, and is connected and fixed to the connection pad not illustrated exposed on the surface of the second substrate by soldering or the like. Furthermore, for example, the connection pad is preferably coupled with the conductive trace, which is a power line.

The operation for mating the first connector 1 and the second connector 101 having the abovementioned configuration will be described next.

Here, the first connector 1 is mounted on the surface of the first substrate by connecting the tail parts 62 of first terminals 61 to the connection pad coupled to the conductive trace on the first substrate not illustrated by soldering or the like, and connecting the tail part 52*a* of the first reinforcing bracket 51 to the connection pad coupled to the conductive trace on the first substrate not illustrated by soldering or the like. It is assumed that the conductive trace coupled to the connection pad to which the tail parts 62 of the first terminals 61 are connected is a signal line, while the conductive trace coupled to the connection pad to which the tail part 52*a* of the first reinforcing bracket 51 is connected is a power line.

Likewise, the second connector 101 is mounted on the surface of the second substrate by connecting the tail parts 162 of second terminal 161 to the connection pad coupled to the conductive trace on the second substrate not illustrated by soldering or the like, and connecting the tail part 156 of the second reinforcement bracket 151 to the connection pad coupled to the conductive trace on the second substrate not illustrated by soldering or the like. It is assumed that the conductive trace coupled to the connection pad to which the tail parts 162 of the second terminals 161 are connected is a signal line, while the conductive trace coupled to the connection pad to which the tail part 156 of the second reinforcement bracket 151 is connected is a power line.

First, an operator places the mating surface 12*a* of the first protrusion 12, which is the mating surface of the first housing 11 of the first connector 1, and the mating surface 111*a* of the second housing 111 of the second connector 101 as opposed to each other, and when the position of the first protrusion 12 of the first connector 1 coincides with the position of the corresponding recessed groove 112*a* of the second connector 1, and the position of the first protruding end part 18 of the first connector 1 coincides with the position of the corresponding mating recess 122 of the first connector 101, the alignment between the first connector 1 and the second connector 101 is completed.

In this state, when the first connector 1 and/or the second connector 101 is moved to come closer to the counterpart side, that is, the mating direction, the first protrusion 12 and the first protruding end part 18 of the first connector 1 are inserted into the recessed groove 112*a* and the mating recess 122 of the second connector 101. This completes mating of the first connector 1 with the second connector 101. Then, the first terminal 61 becomes conductive with the second terminal 161.

Next, a modification of the first connector 1 will be described.

Figure 10:
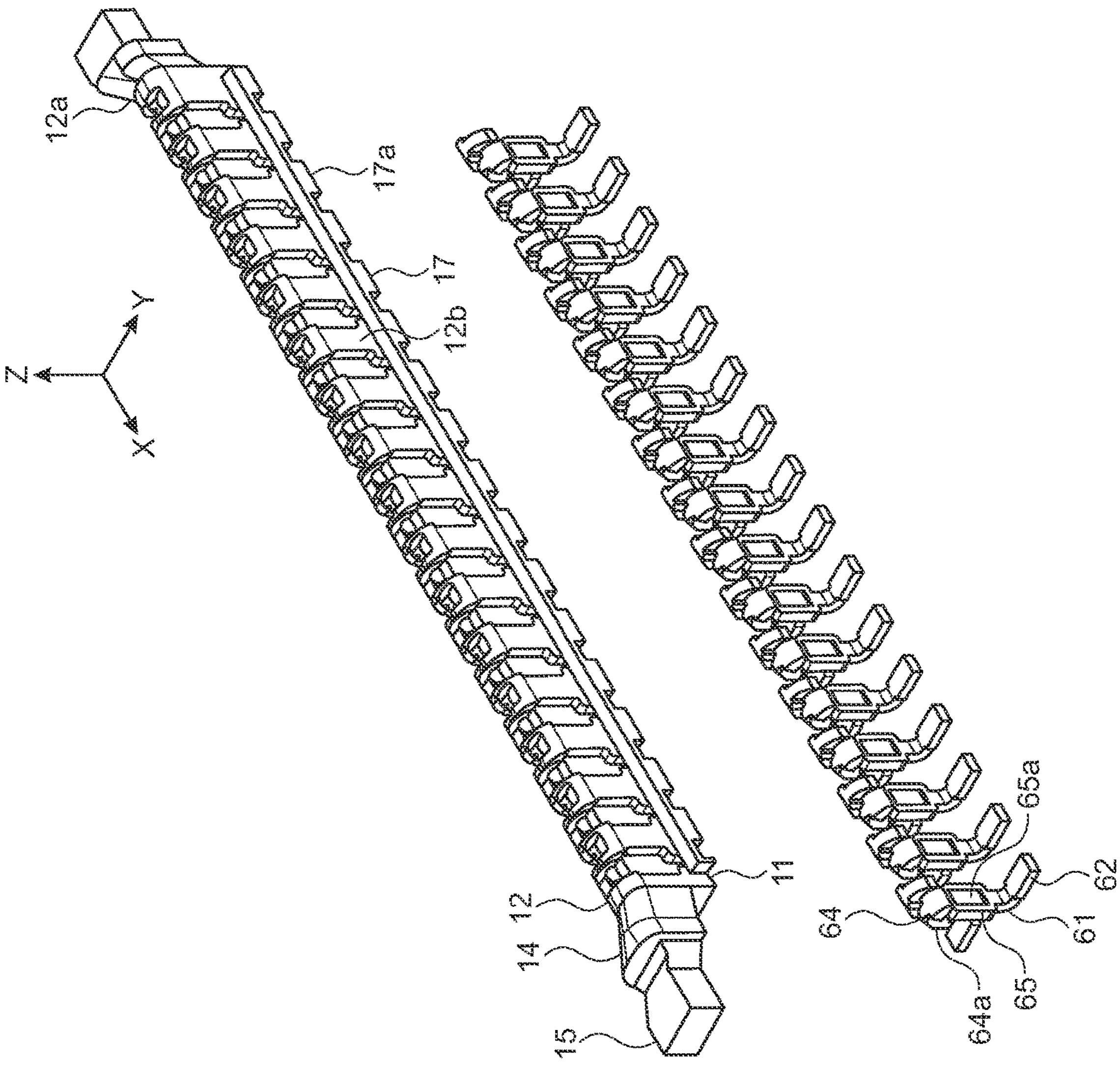
FIG. 10 is an exploded view illustrating a left half body part in a modification of the first connector according to the present embodiment.
Figure 11:
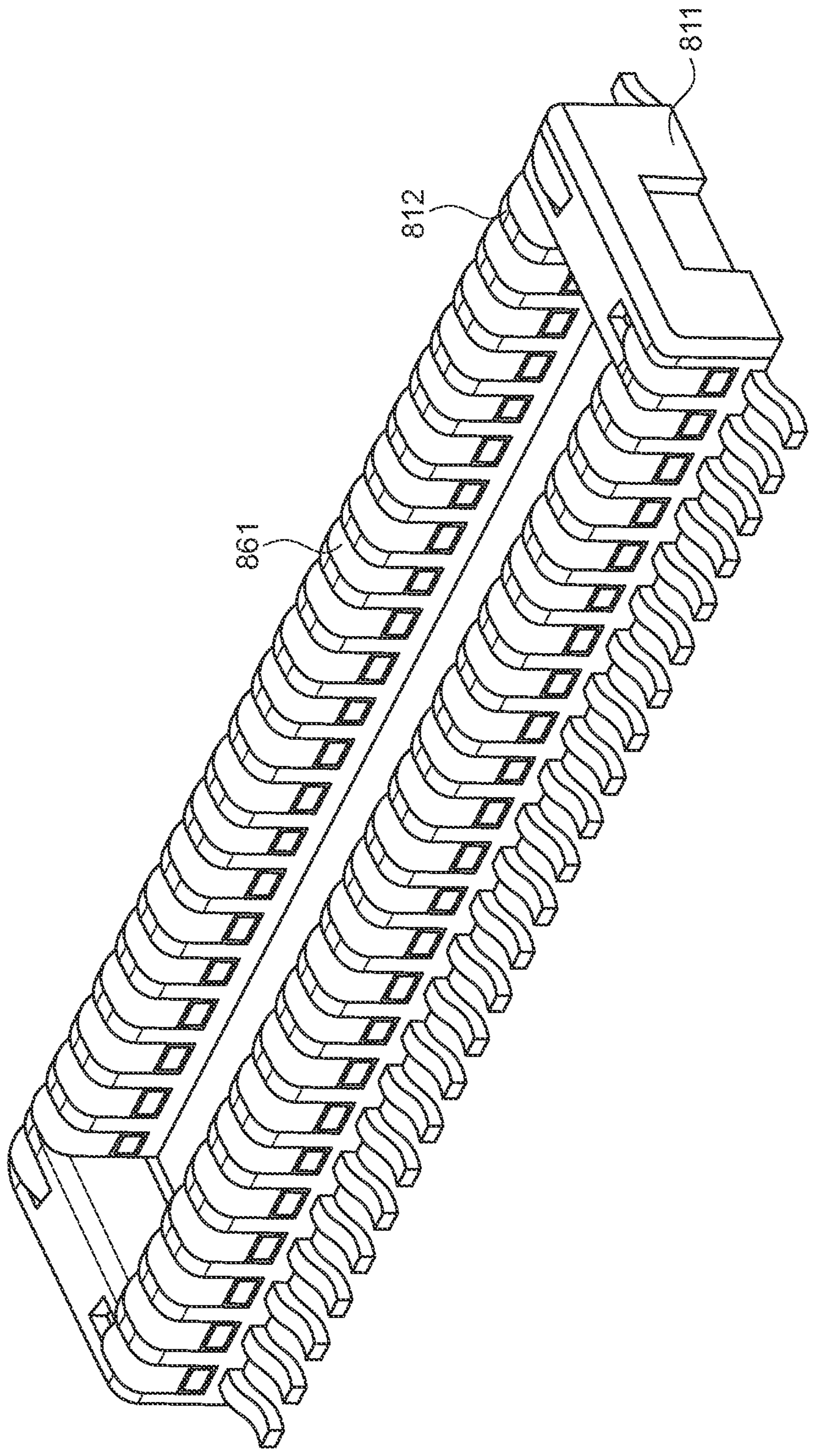
FIG. 11 (PRIOR ART)
FIG. 11 is a perspective view illustrating a known connector.

FIG. 10 is an exploded view illustrating a left half body part in the modification of the first connector according to the present embodiment.

In the illustrated modification, the first terminal 61 includes no body part 63, and has a contact part 65 that vertically extends, a tail part 62 that is bent by approximately 90 degrees and connected to the lower end of the contact part 65, and an upper end part 64 that is bent by approximately 90 degrees and connected to the upper end of the contact part 65. Note that an embedded part 64*a* that is bent by approximately 90 degrees and extends downward is connected to the tip of the upper end part 64. The embedded part 64*a* is a part embedded in the first protrusion 12 downward from the mating surface 12*a*.

In the first terminal 61 illustrated in FIG. 2 and the like, the tail part 62 extends in a opposite direction to the facing direction of the contact part 65, however, in the first terminal 61 in the modified example illustrated in FIG. 10, the tail part 62 extends in the same direction as the facing direction of the contact part 65. Accordingly, it is easy to hold the terminal carrier 68 connected to the tips of the tail parts 62 via the elongated connection arms 68*a*, and set the plurality of first terminals 61 in the primary mold from both left and right sides such that the first terminals are alternately oriented in opposite directions.

Note, the other configurations, operations, and effects of the first terminal 61 in the modification in FIG. 10 are the same as those of the first terminal 61 illustrated in FIG. 2 and the like and thus, description thereof is omitted.

As described above, in the present embodiment, the first connector 1 includes the half body parts 10 that each include the first housing 11 and the plurality of first terminals 61 attached to the first housing 11, and the first protruding end parts 18 formed at the both ends in the first housing 11 of the half body parts 10 by allowing the first housings 11 to abut each other, and the first reinforcing brackets 51 attached to the first protruding end parts 18. Each of the first housings

11 is a member integrated with the first terminal 61 by the primary insert molding, and includes the first protrusion 12 that extends in the longitudinal direction and holds the first terminals 61, the extended end parts 14 connected to the both ends in the longitudinal direction of the first protrusion 12, and the embedded part 15 that extends from the extended end parts 14. The first protruding end part 18 includes the covering part 16 that covers at least a part of the extended end part 14 and the entirety of the embedded part 15 of each first housing 11, and the covering part 16 is a member integrated with the extended end part 14, the embedded part 15, and the first reinforcing bracket 51 by the secondary insert molding.

This may reduce the spacing between the first protrusions 12 of the first housing 11, to which the plurality of first terminals 61 is mounted, enabling reduction of the first connector 1 in size. In addition, manufacturing the first connector 1 is simplified and reliability of the first connector 1 is improved.

The first reinforcing bracket 51 includes an upper plate 54 that extends in the width direction of the first housing 11, the pair of left and right legs 55 that are connected to both left and right edges of the upper plate 54 and extend downward, and the end wall outer surface covering part 52 and an end wall inner surface covering part 53 that are connected to both the front and rear edges of the upper plate 54 and extend downward. The embedded part 15 is disposed so as at least partially overlap with the upper plate 54, the leg 55, the end wall outer surface covering part 52, and the end wall inner surface covering part 53 when viewed from the vertical, front-back, and left-right directions. As a result, the embedded part 15 of the left half body part 10A is firmly connected to the embedded part 15 of the right half body part 10B with the covering part 16 integrated with the first reinforcing bracket 51 to reliably constitute the first protruding end part 18 to connect the left half body part 10A to the right half body part 10B.

Furthermore, the embedded part 15 of each first housing 11 includes the parallel inner surface **15*c*1 that extends in the longitudinal direction of the first housing 11 and faces the embedded part 15 of the other first housing 11. The distance L2 between the opposed parallel inner surfaces 15*c*1 is smaller than the width L1 of the end wall inner surface covering part 53 of the first reinforcing bracket 51 disposed so as to face the gap between the opposed parallel inner surfaces 15*c*1. As a result, the boundary between the parallel inner surface 15*c*1 of the embedded part 15 formed by the primary insert molding and the covering part 16 formed by the secondary insert molding overlap with the end wall inner surface covering part 53 when viewed from the front-back direction, and thus, is hard to be separated, increasing the strength of the first protruding end part 18**.

Furthermore, the end wall inner surface covering part 53 is disposed so as to be opposed to the inclined inner surface **15*c*2, which is connected to each of the opposed parallel inner surfaces 15*c*1 and is opposed to the inclined inner surface 15*c*2 of the embedded part 15 inclined with respect to the longitudinal direction of the first housing 11, and has a gap from the inclined inner surface 15*c*2**.

Furthermore, the embedded part 15 of each first housing 11 includes the outer surface **15*b* that extends in the longitudinal direction of the first housing 11 and faces the leg 55 of the first reinforcing bracket 51, and the length L4 of the outer surface 15*b* is smaller than the length L3 of the leg 55. As a result, the boundary between the outer surface 15*b* of the embedded part 15 formed by the primary insert molding and the covering part 16 formed by the secondary insert molding is covered with the leg 55 when viewed from the left and right direction, and thus, is hard to be separated, increasing the strength of the first protruding end part 18**.

Furthermore, the extended end part 14 of each first housing 11 is inclined inward in the width direction of the first connector 1, and extends from both ends in the longitudinal direction of the first protrusion 12, and the width of the first protruding end part 18 is smaller than the width of the first connector 1. In this way, the width of the first protruding end part 18 can be smaller than the width of the first connector 1, in mating the first connector 1 with the second connector 101, even when the contact side parts 154 are disposed on the left and right inner walls of the mating recess 122 of the second housing 111, into which the first protruding end part 18 is inserted, and the width of the mating recess 122 becomes substantially small, it is allowable.

Note that the disclosure of the present specification describes characteristics related to a preferred and exemplary embodiment. Various other embodiments, modifications, and variations within the scope and spirit of the claims appended hereto could naturally be conceived of by persons skilled in the art by summarizing the disclosures of the present specification. For example, the staggered arrangement of the terminals does not have to be systematic. In addition, the arrangement of the terminals on the left and right half body parts does not need to be the same. Furthermore, the left and right half body parts do not need to be axially symmetric.

The present disclosure can be applied to connectors.

The invention claimed is:

1. A connector, comprising:

a half body part including a connector main body and a plurality of terminals mounted to the connector main body; and a main body end part formed at both ends of the connector main bodies of each half body part, and a reinforcement fitting integrated with the main body end part, wherein each of the connector main bodies includes a protruding part that is integrated with the terminals and extends in the longitudinal direction thereof, each of the terminals includes a wide contact point that extends in the vertical direction and an upper part more narrow than the contact point that is connected to the upper end of the contact point, the terminals, which are arranged in series in the longitudinal direction of the protruding part, are orientated such that adjacent terminals face in opposite directions in regard to the width direction of the protruding part, and the adjacent upper parts are disposed so as to overlap when viewed in the longitudinal direction of the protruding part.

2. The connector according to claim 1, wherein each of the terminals protrude outside the connector main body in the width direction and include a tail part connected to a board, and terminals are disposed so that the tail parts of adjacent terminals face mutually opposite directions with regards to the width direction of the connector main body.

3. The connector according to claim 2, wherein each of the connector main bodies include a bottom plate part that extends in the longitudinal direction thereof, the protruding part is integrally formed on the upper surface of the bottom plate part, and the tail part protrudes from the bottom plate part to outside the connector main bodies in the width direction.

4. The connector according to claim 1, wherein a space between the left and right half body parts is a long, narrow, recessed groove part that extends in the longitudinal direction of the connector, and the recessed groove part is open at the upper surface and the lower surface of the connector.

5. A connector pair, comprising:
the connector according to claim 1; and
a counterpart connector that mates with the connector.

6. A connector, comprising:
a left connector main body;
a right connector main body;
a first main body end part that connects a first end of the left connector main body and a first end of the right connector main body;
a second main body end part that connects a second end of the left connector main body and a second end of the right connector main body;
a plurality of first terminals attached to the left connector main body;
a plurality of second terminals attached to the right connector main body;
a first reinforcement fitting attached to the first main body end part; and
a second reinforcement fitting attached to the second main body end part,
wherein
the left connector main body is a member integrated with the plurality of first terminals by insert molding and the right connector main body is a member integrated with the plurality of second terminals by insert molding,
the left connector main body includes a protruding part that retains the plurality of first terminals and extends in the longitudinal direction thereof, and
the right connector main body includes a protruding part that retains the plurality of second terminals and extends in the longitudinal direction thereof and, the plurality of first terminals are attached to the left connector main body in alternating directions, and the plurality of second terminals are attached to the right connector main body in alternating directions.

7. A connector pair, comprising:
the connector according to claim 6; and
a counterpart connector that mates with the connector.

8. A connector, comprising:
a left connector main body;
a right connector main body;
a first main body end part that connects a first end of the left connector main body and a first end of the right connector main body;
a second main body end part that connects a second end of the left connector main body and a second end of the right connector main body;
a plurality of first terminals attached to the left connector main body in which each has a tail part;
a plurality of second terminals attached to the right connector main body in which each has a tail part;
a first reinforcement fitting attached to the first main body end part; and
a second reinforcement fitting attached to the second main body end part,
wherein
the left connector main body is a member integrated with the plurality of first terminals by insert molding, the right connector main body is a member integrated with the plurality of second terminals by insert molding,
the left connector main body includes a bottom plate part that extends in the longitudinal direction thereof, the right connector main body includes a bottom plate part that extends in the longitudinal direction thereof,
the left connector main body includes a protruding part that retains the plurality of first terminals, that extends in the longitudinal direction thereof, and is integrally formed on the bottom plate part, and the right connector main body includes a protruding part that retains the plurality of second terminals, that extends in the longitudinal direction thereof, and is integrally formed on the bottom plate part, and
the tail parts of the plurality of first terminals are exposed to the mounting surface of the bottom plate part of the left connector main body, and the tail parts of the plurality of second terminals are exposed to the mounting surface of the bottom plate part of the right connector main body.

9. A connector pair, comprising:
the connector according to claim 8; and
a counterpart connector that mates with the connector.

10. A connector, comprising:
a half body part including a connector main body and a plurality of terminals mounted to the connector main body; and
a main body end part connected at both ends of the connector main bodies of each half body part, and a reinforcement fitting attached to the main body end part,
wherein
each half body part is a member integrated with the connector main body and the plurality of terminals by a first round of insert molding,
the main body end part is a member integrated with both ends of the connector main body of each half body part and the reinforcement fitting by a second round of insert molding,
the terminals, which are arranged lined up in the longitudinal direction of the connector main body, are orientated such that adjacent terminals face in opposite directions in regard to the width direction of the connector main body.

11. The connector according to claim 10, wherein each of the terminals include a tail part connected to a board, and the terminals are disposed so that the tail parts of adjacent terminals extend in mutually opposite directions with regard to the width direction of the connector main bodies.

12. The connector according to claim 10, wherein left and right half body parts are spaced apart from each other.

13. A connector pair, comprising:
the connector according to claim 10; and
a counterpart connector that mates with the connector.

14. A connector pair comprising:
a first connector including a first housing and a plurality of first terminals mounted in the first housing; and
a second connector including a second housing and a plurality of second terminals mounted in the second housing, the second connector being mated with the first connector,
wherein
each first terminal and each second terminal include a contact part and a board connecting part,
the plurality of first terminals are arranged to form a plurality of rows extending in a longitudinal direction of the first housing, and first terminals adjacent to each other in the longitudinal direction of the first housing are in a mutually opposing orientation with respect to a width direction of the first housing, while first terminals adjacent to each other in the width direction of the first housing mutually have the same orientation with respect to the width direction of the first housing, the plurality of second terminals are arranged to form a plurality of rows extending in a longitudinal direction of the second housing, and second terminals adjacent to each other in the longitudinal direction of the second housing are in a mutually opposing orientation with respect to a width direction of the second housing, while second terminals adjacent to each other in the width direction of the second housing mutually have the same orientation with respect to the width direction of the second housing, those board connecting parts of the plurality of first terminals that are board connecting parts positioned on an inner side in the width direction of the first housing are visible from the mating surface of the first housing, and in a state where the first connector and the second connector are mutually mated together, the mutually corresponding contact parts and the board connecting parts of the first terminal and the second terminal face each other.

15. The connector pair according to claim 14, wherein each of the second terminals include a main body part retained in the second housing, and the main body part is positioned closer to the board connecting part than the contact part.

16. The connector pair according to claim 15, wherein the second housing includes a cavity extending in the mating direction, and the main body parts of the second terminals are stowed in the cavity.

17. The connector pair according to claim 15, wherein board connecting parts of the second terminals are exposed on a mounting surface of the second housing.

18. The connector pair according to claim 14, wherein the first terminals are integrated with the first housing and retained in the first housing.

19. The connector pair according to claim 14, wherein the first housing and the second housing respectively have reinforcement fittings attached to both ends in the longitudinal direction.

* * * * *